United States Patent [19]

Honda et al.

[11] Patent Number: 5,657,379

[45] Date of Patent: Aug. 12, 1997

[54] DATA COMMUNICATION APPARATUS AND METHOD FOR PERFORMING NOISELESS DATA COMMUNICATION USING A SPREAD SPECTRUM SYSTEM

[75] Inventors: Toyota Honda, Yokohama; Teiji Okamoto; Toru Tanaka, both of Fujisawa, all of Japan

[73] Assignee: Hitachi, Ltd., Tokyo, Japan

[21] Appl. No.: 457,508

[22] Filed: Jun. 1, 1995

[30] Foreign Application Priority Data

Jun. 3, 1994 [JP] Japan .................... 6-122746

[51] Int. Cl.$^6$ .................... H04M 11/00
[52] U.S. Cl. .................... 379/93.28; 348/17; 379/100.17; 379/93.08
[58] Field of Search .................... 379/98, 97, 96, 379/93, 100; 348/14, 15, 16, 17, 18, 19, 13; 375/222, 200

[56] References Cited

U.S. PATENT DOCUMENTS

| | | | |
|---|---|---|---|
| 4,425,642 | 1/1984 | Moses et al. | 375/200 |
| 4,425,661 | 1/1984 | Moses et al. | 375/200 |
| 4,672,605 | 6/1987 | Hustig et al. | 375/200 |
| 4,932,047 | 6/1990 | Emmons et al. | 379/98 |
| 4,943,973 | 7/1990 | Werner | 375/200 |
| 5,036,513 | 7/1991 | Greenblatt | 379/96 |
| 5,311,578 | 5/1994 | Bremer et al. | 379/97 |
| 5,404,377 | 4/1995 | Moses | 375/200 |
| 5,432,815 | 7/1995 | Kang et al. | 375/200 |

FOREIGN PATENT DOCUMENTS

| | | | |
|---|---|---|---|
| 3-110988 | 5/1991 | Japan . | |
| 4-188997 | 7/1992 | Japan | H04Q 9/00 |
| 5-22419 | 3/1993 | Japan . | |

*Primary Examiner*—Stella Woo
*Attorney, Agent, or Firm*—Antonelli, Terry, Stout & Kraus, LLP

[57] ABSTRACT

A data communication system by which simultaneous communication of voice and data is possible without disturbing voice communication. During communication between a first telephone and a second telephone through a telephone line, when a data signal from a computer is fed to a data communication system, the data signal is modulated according to a spread spectrum system by a spread spectrum modem, mixed with the voice signal, and transmitted from a line interface to the telephone line. The signal including the spread spectrum modulated data signal and the voice signal is received in the second telephone. The voice mixed with spread spectrum modulated data signal is heard at the second telephone with only slight noise. Thus, talking can continue undisturbed, because energy of the data signal is spread to a wider band.

4 Claims, 6 Drawing Sheets

DATA COMMUNICATION APPARATUS AND METHOD FOR PERFORMING NOISELESS DATA COMMUNICATION USING A SPREAD SPECTRUM SYSTEM

BACKGROUND OF THE INVENTION

This invention relates to a data communication system for transmitting voice signal and data signal simultaneously using a communication line for voice signal such as a telephone line.

Methods for transmitting voice signal and data signal simultaneously using a telephone line such as a method disclosed in Japanese Patent Provisional Publication Heisei 3-110988 (1991) and a method standardized as a standard of tele-writing which is a system for transmitting data signal such as hand written graphic during talking have been proposed. In these methods, a part of voice band is utilized as band for data signal, and data signal is modulated to multiplex with voice signal.

However, the above mentioned technologies are disadvantageous in that when voice signal and data signal are transmitted simultaneously in the situation that the type of the system of a counterpart is unknown. Further when the signal is received with a conventional telephone, voice mixed with a modulated data signal is received, and talking is impossible and uncomfortable for the receiver, due to employing frequency a multiplexing system which multiplexes data signal on a part of voice band. The above-described calling causes no problem if the of transmitter and receiver are of the same type of system.

SUMMARY OF THE INVENTION

It is an object of the present invention to provide a data communication system for communicating voice signal and data signal simultaneously without disturbing voice communication.

To accomplish the above mentioned object, in this invention a modulator-demodulator by spread spectrum system (referred to SS modem hereinafter) is provided for data.

The SS modem is used for data communication during talking. The spread spectrum system is a system which spread energy of a signal to a frequency band wider than the original frequency band, the signal modulated by this system is equivalent to mere noise for other signals. When voice and data are communicated simultaneously using the SS modem and the data signal is received with a conventional telephone, the voice is received with slightly increased noise and talking is possible.

DESCRIPTION OF THE PREFERRED EMBODIMENTS

Figure 1:
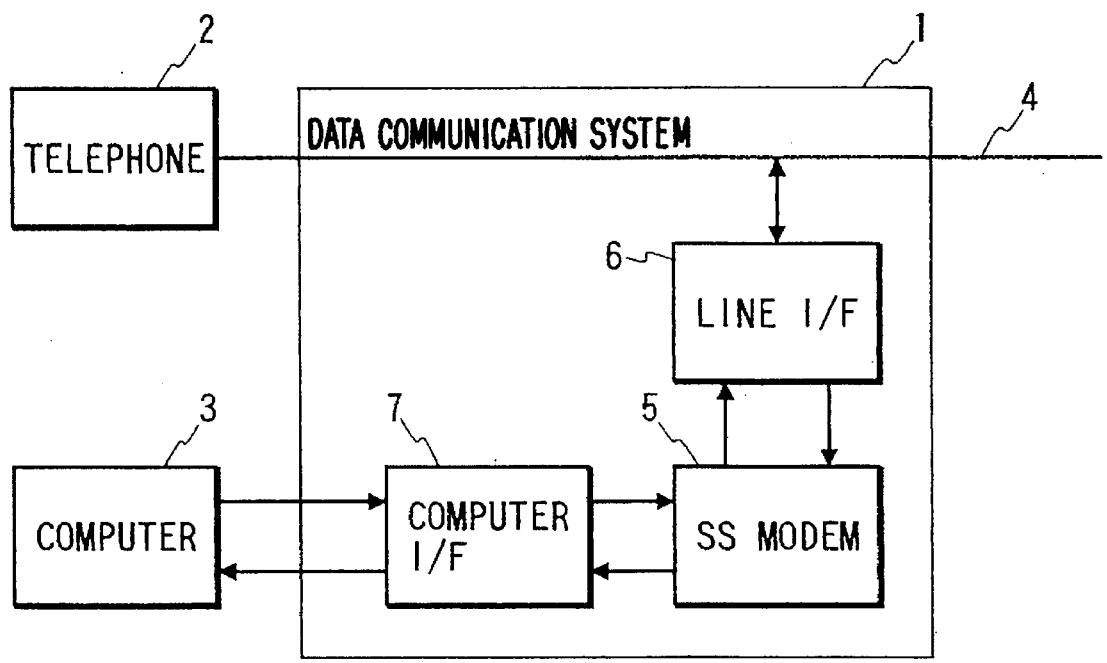
FIG. 1 is a block diagram for illustrating an embodiment of the data communication system in accordance with the present invention.

The present invention will be described in detail hereinafter referring to the drawings.

FIG. 1 is a block diagram for illustrating an embodiment of a data communication system in accordance with the present invention, 1 is a data communication system of the embodiment, 2 is a conventional telephone, 3 is a computer, 4 is a telephone line, 5 is an SS modem, 6 is a line interface, and 7 is a computer interface.

In the drawing, the telephone line 4 is connected to the conventional telephone through the internal of the data communication system 1. The data communication system 1 is provided with the SS modem (modulator-demodulator by spread spectrum system) 5, the SS modem 5 is connected to the telephone line 4 through the line interface 6. The SS modem 5 is also connected to the computer 3 through the computer interface 7. The line interface 6 is constituted with, for example, a line transformer.

The spread spectrum system is a system in which energy of the original signal is spread to wider frequency band than the frequency band of the original signal by applying random pulse train on the signal to be communicated and the signal is communicated. By differentiating the random pulse train between call-out side and call-in side signals, full duplex-communication is possible. Therefore, without a two-wire four-wire conversion circuit in the line interface 6, full duplex-communication is possible. The computer interface 7 is a circuit such as RS-232C for connecting the computer 3 to the SS modem 5.

Data signal output from the computer 3 is fed to the SS modem 5 through the computer interface 7, where the data signal is modulated by spread spectrum system, and transmitted to the telephone line 4 through the line interface 6, while the telephone 2 is communicating with a counterpart telephone, not shown in the figure, through the telephone line 4. As mentioned above, data signal is transmitted to a counterpart, when as described hereinbefore, the telephone 2 or counterpart telephone receives data signal modulated by spread spectrum system with voice signal, the telephone receives only slightly increased noise because energy of such data signal is spread to wide band. Therefore in this embodiment, data transmission during talking causes only slight noise, and data communication is possible without disturbing talking.

Figure 2:
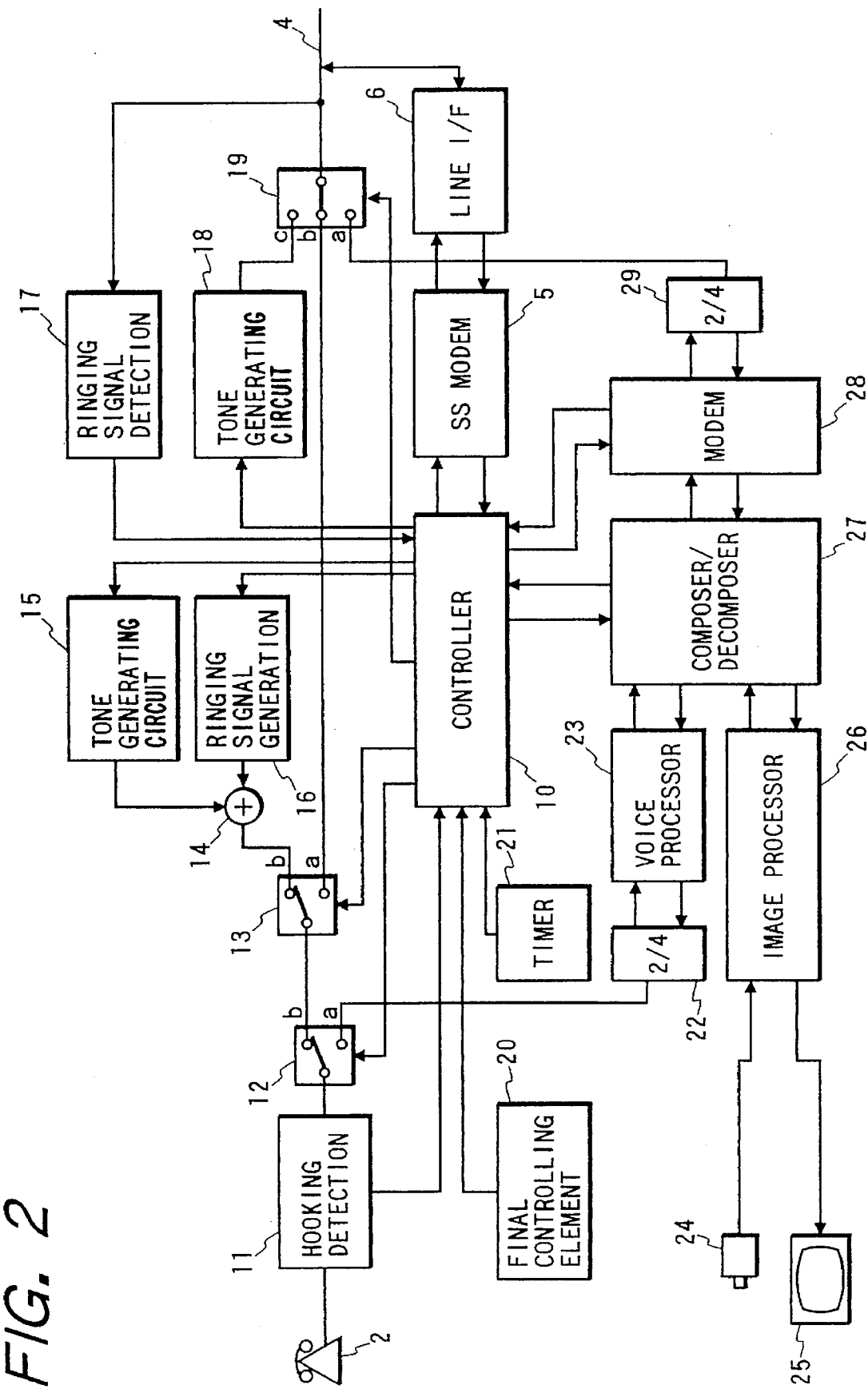
FIG. 2 is a block diagram for illustrating a detailed structure of a case in which the embodiment shown in FIG. 1 is applied to a video phone.

FIG. 2 is a block diagram for illustrating a detailed structure of a case in which the embodiment shown in FIG. 1 is applied to a video phone, in the drawing, 10 is a controller, 11 is a hooking detection circuit, 12 and 13 are changeover switches, 14 is a composer circuit, 15 is a tone generating circuit, 16 is a ringing signal generating circuit, 17 is a ringing signal detection circuit, 18 is a tone generating circuit, 19 is a changeover switch, 20 is a final controlling element, 21 is a timer, 22 is a two-wire four-wire conversion circuit, 23 is a voice processor, 24 is a video camera, 25 is a display device, 26 is an image processor, 27 is a composer-decomposer, 28 is a modem, and 29 is a two-wire-four-wire conversion circuit, the same symbols are assigned to corresponding members in FIG. 1 to avoid duplicate description.

In the drawing, the tone generating circuit 15 generates various tone signals. The ringing signal generating circuit 16 generates ringing signal for calling the telephone 2, and feeds direct current to the telephone 2. The ringing signal detection circuit 17 detects ringing signal arriving from a counterpart through the telephone line 4. The tone generating circuit 18 terminates the telephone line 4 and sends out various tone signals to the telephone line 4. The controller 10 controls the whole system totally, and is constituted with a microcomputer and memory. The two-wire four-wire conversion circuits 22, 29 separate the signal on the telephone line 4 to transmission and reception. The voice processor 23 digitally converts and compresses voice signal from the telephone 2 and expands back received voice data to analogue voice signal. The image processor 26 digitally converts and compresses image signal taken by the video camera 24, and expands back received image data to analogue image signal. The composer decomposer 27 composes voice data from the voice processor 23 and image data from the image processor 26 synchronously with transmission speed to communicate the both signals simultaneously, and separates received data into voice data and image data and feeds to the voice processor 23 and image processor 26 respectively. The modem 28 transmits data at high speed through the telephone line 4.

Procedures for starting a communication between two video phones are described hereinafter referring to FIG. 3 providing that the counterpart video phone has the same structure as described in FIG. 2. The video phone of the calling-out side is referred to video phone A and the video phone of the calling-in side is referred to video phone B herein, and FIG. 2 is used for description of the both video phones.

Figure 3:
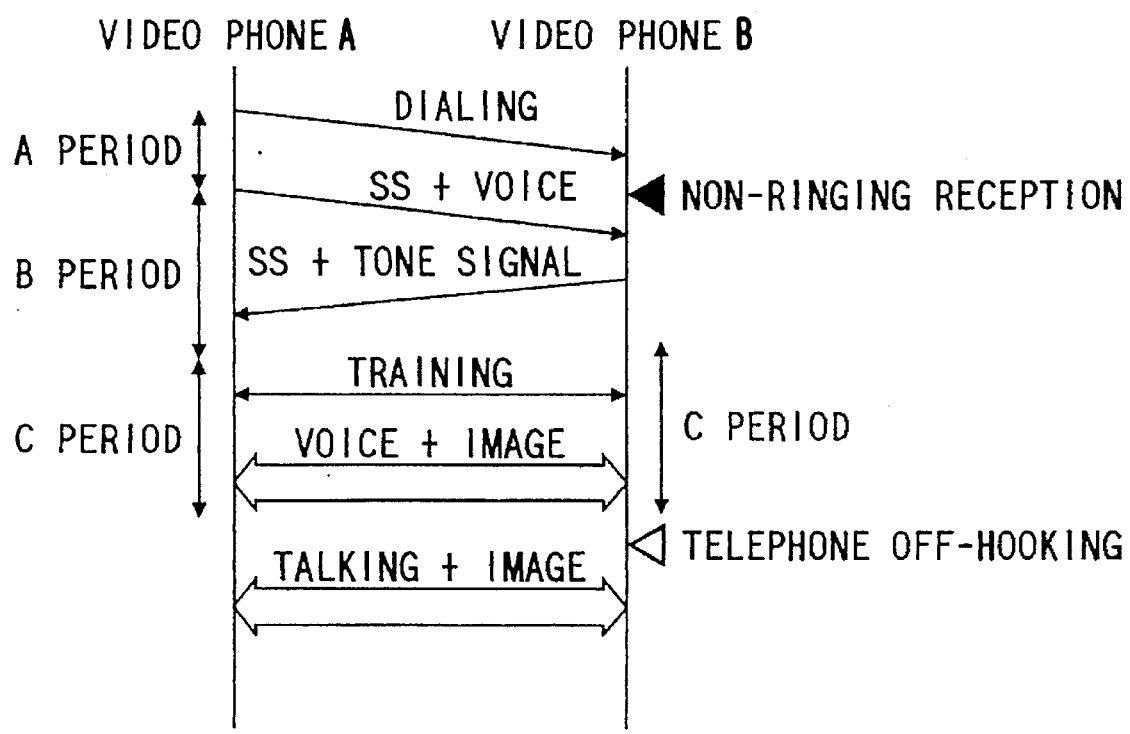
FIG. 3 is a diagram for illustrating a sequence for a case in which image data and voice data are communicated between two video phones having the structure shown in FIG. 2.

In FIG. 2 and FIG. 3, the changeover switches 12, 13, 19 are all closed to the b-side during no talking. When the receiver of the telephone 2 is taken up to call from the video phone A side, the hooking detection circuit 11 detects the taking up, and the controller 10 turns the changeover switch 13 to a-side corresponding to the detection output to connect the telephone 2 directly to the telephone line 4.

Then, when dialing the phone number of a counterpart (video phone B), ring back tone from the switching system, which is a signal for the transmitter to perceive the accessing, is heard from the telephone 2 during the access period to the counterpart (this period is referred to A-period as shown in FIG. 3), and the accessing is confirmed. After the completion of the dialing or the confirmation of off-hooking by the counterpart, until a certain period has counted out by the timer circuit 21 or a certain signal is transmitted from the counterpart, the signal, which identifies that the transmission is from a video phone (controlling signal as described herein being transmitted until starting of image signal and voice signal from a video phone is referred to control-procedure signal), is sent from the SS modem 5 to the counterpart through the line interface 6. At this time, voice which enter into the receiver of the telephone 2 is also transmitted to the counterpart.

When ringing signal arrives to the telephone line 4 of the video phone B for talking from the video phone A, the changeover switches 12, 13, 19 are all closed to b-side, therefore the telephone 2 does not ring. The ringing signal detection circuit 17 detects the ringing signal. The controller 10 switches the changeover switch 19 to c-side to off-hook the telephone line 4 (referred to non-ringing reception) when the ringing signal detection circuit 17 detects the ringing signal of a certain number or for a certain period. In this situation, the video phone B monitors the control procedure signal from the counterpart (in this case, video phone A) by the SS modem 5 and transmits certain tone signal from the tone generating circuit 18. The tone signal may be, for example, simulated ringing sound having the same period and frequency as ring back tone signal generated from the switching system, melody signal, message signal such as "connecting to video phone", or other type of signals.

When the controller 10 receives certain SS (spread spectrum) modulated control procedure signal transmitted from the video phone A within a certain period counted by the timer circuit 21, the control procedure signal as corresponding signal is modulated by the SS modem, and the modulated signal is transmitted with tone signal. By mutually exchanging of these SS modulated control procedure signals, the video phones A, B can identify the type and characteristics of devices mutually.

While the video phone B receives non-ringing reception followed by exchanging of SS modulated control procedure signal mutually (this period is referred to B-period), sound composed of tone signal and SS modulated signal from the video phone 2 is heard at the video phone A.

After the mutual identification of the type and characteristics of devices of video phones A and B as described herein above, the controller 10 switches the changeover switch 19 to a-side in the video phones A, B, to connect the modem 28 to the telephone line 4 through the two-wire four-wire conversion circuit 29. Then, the both modems 28 of the video phones A, B exchange training action for communication each other, and after the completion of the training action the voice and image are communicated simultaneously.

When the training action is started, the changeover switches 12, 13 are closed to b-side in the video phone 2, ringing signal is generated from the ringing signal generating circuit 16 to ring the telephone 2. When a receiving person at the video phone B side hears the ringing and takes the receiver of the telephone up (telephone is off-hooked), the hooking detection circuit 11 detects the off-hooking and thereby the controller 10 stops the generation of the ringing signal from the ringing signal generating circuit 16, and switches the changeover switch 12 to a-side. Then, video talking with the video phone A are ready.

The changeover switch 13 of the video phone A is being switched to b-side and the tone generating circuit 15 is generating certain tone signal during the period from the training action to the off-hooking of the video phone B (the period is referred to C-period as shown in FIG. 3). In this situation, the tone signal is heard at the telephone 2. The tone signal may be, for example as mentioned hereinbefore, simulated ringing sound or message signal telling the connecting now.

Any method for simultaneous transmission of voice signal and image signal may be employed, the embodiment shown in FIG. 2 illustrates an example of time-division multiplex system by packet communication using a high speed modem.

In the Video phones A, B, voice signal from the telephone 2 is fed to the voice processor 23 through the two-wire four-wire conversion circuit 22, the voice signal is converted to digital signal and compressed by the voice coder-decoder. On the other hand, image signal output from the video camera 24 is fed to the image processor 26, converted to digital signal and then compressed by the image coder-decoder. Voice data from the voice processor 23 and image data from the image processor 26 is combined to form a certain packet by the composer-decomposer 27, and transmitted to the telephone line 4 through the modem 28 and the two-wire four-wire conversion circuit 29.

The voice data and image data transmitted through the telephone line 4 are received by the modem 28, and separated into voice data and image data by the composer-decomposer 27. The voice data is expanded by the voice coder-decoder in the voice processor 23, converted to analogue signal, and transmitted to the telephone 2 through the two-wire four-wire conversion circuit 22. The image data is expanded by the image coder-decoder in the image processor 26, converted to analogue signal, and transmitted to the display device 25 to display an image.

In the case of the embodiment described hereinbefore, tone signal transmitted from the video phone B during the B-period shown in FIG. 3 and tone signal generated from the video phone A during the C-period described hereinbefore are simulated to usual ringing sound, and thereby ring back tone from the switching system or sound similar to the ring back tone is heard at the telephone 2 of the video phone A, similarly to the conventional telephone during the period from dialing to off-hooking of the telephone of the video phone B, hence a call can be made without discomfort.

In the case of conventional video phone system, a video phone of calling-out side continues to transmit procedure signal for identifying the type and characteristics of the video phone of a calling-in side using a modem served for transmission of voice data and image data after dialing to switch the video phone of the calling-in side to video phone mode. Thereby, at the video phone of calling-in side, discomfortable sound is heard due to procedure signal from the video phone of the calling-out side when the receiver of the calling-in side is off-hooked, and talking is impossible until communication between modems of video phones of calling-out side and calling-in side are set up. On the other hand, in the case of the embodiment of the present invention, the telephone can be used as a video phone immediately after off-hooking the telephone of the video phone of calling-out side, and uncomfortable sound will not be heard and talking with a counterpart can be made immediately after off-hooking.

Sequence of access from the video phone shown in FIG. 2 to a conventional telephone will be described referring to FIG. 4.

Figure 4:
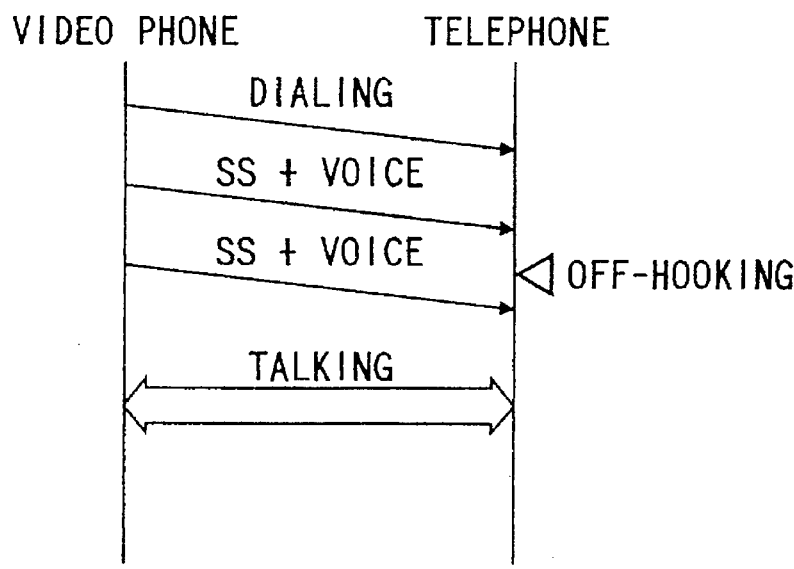
FIG. 4 is a diagram for illustrating a sequence for another case in which the video phone shown in FIG. 2 calls a conventional telephone.

In FIG. 2 and FIG. 4, the video phone, after dialing to a counterpart not shown in the drawing (conventional telephone), SS modulates control procedure signal for identifying the type and characteristics of the video phone by the SS modem 5 and transmits to the counterpart with voice as in the same manner as described in FIG. 3. At the calling-in side when a telephone is off-hooked, control procedure signal SS modulated at the telephone and voice are heard. The sound is almost normal sound with slight noise, talking can be made without discomfort.

The video phone monitors if SS modulated control procedure signal is transmitted from the counterpart during a certain period counted by the timer circuit 21 after the completion of dialing or off-hooking of the telephone of the counterpart, and if certain control procedure signal is not transmitted from the counterpart, the video phone of the calling-out side judges that the telephone of the counterpart is a conventional telephone, stops the transmission of SS modulated procedure signal, and functions as a conventional telephone.

In this case, when the telephone of the calling-in side is off-hooked, discomfortable signal will be heard at the conventional video phone, but in this embodiment such discomfortable signal will not be heard.

Sequence of access from a conventional telephone to the video phone shown in FIG. 2 will be described referring to FIG. 5.

Figure 5:
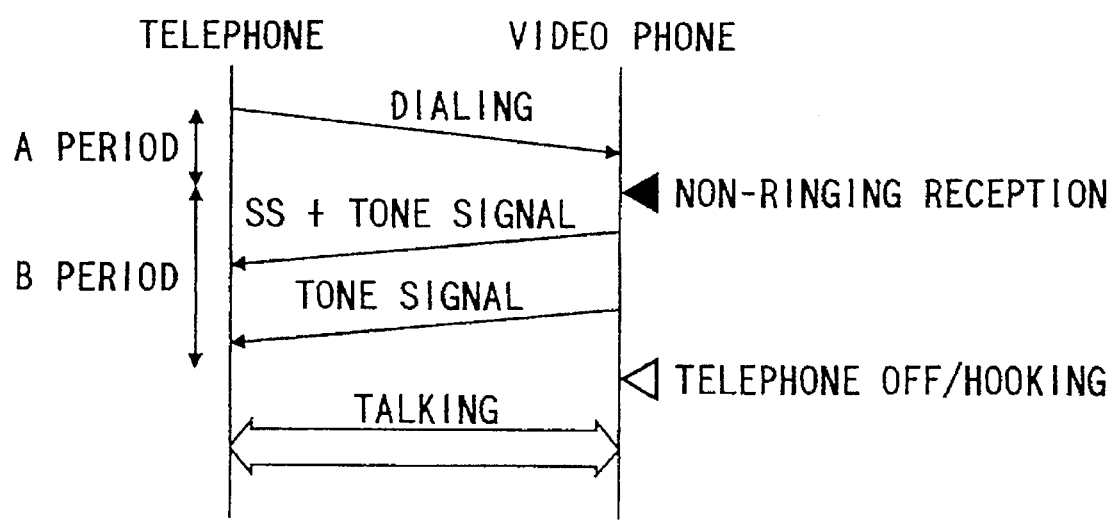
FIG. 5 is a diagram for illustrating a sequence for further case in which a conventional telephone calls the video phone shown in FIG. 2.

In FIG. 2 and FIG. 5, a conventional telephone not shown in the drawing is dialed to the video phone of the counterpart, and then ring back tone signal telling the ringing will be heard at the receiver of the telephone. The video phone of the calling-in side shown in FIG. 2 detects certain ringing signal by the ringing signal detection circuit 17 and receives non-ringing reception as in the same manner as described in FIG. 3, and the controller 10 transmits SS modulated control procedure signal and tone signal to the counterpart (the conventional telephone described above) and monitors if SS modulated control procedure signal is transmitted from the counterpart.

If SS modulated control procedure signal is not transmitted from the counterpart for a certain period, the controller 10 stops the transmission of SS modulated control procedure signal, and tone signal is transmitted to the counterpart from the tone generating circuit 18 while ringing signal is generated from the ringing signal generating circuit 16 to ring the telephone 2. When the telephone 2 is taken up and off-hooked, the controller 10 stops transmission of the tone signal and generation of the ringing signal and switches the changeover switches 11, 12, 19 to a-side, and thereby talking to the conventional telephone of the counterpart becomes possible.

In this case also, for example, by simulating the tone signal transmitted by the video phone to ring back tone signal, at the conventional telephone of the calling-out side, the signal similar to ring back tone signal will be heard during a period from the completion of dialing to off-hooking of the telephone of the counterpart (the telephone 2 connected to the video phone in FIG. 2), and talking can be made without discomfort.

As described hereinbefore, in the case that the embodiment shown in FIG. 1 is applied to a video phone as illustrated in FIG. 2, talking can be made without discomfort not only in the case of communication between two video phones but also in the case of communication between a video phone and a conventional telephone.

Figure 6:
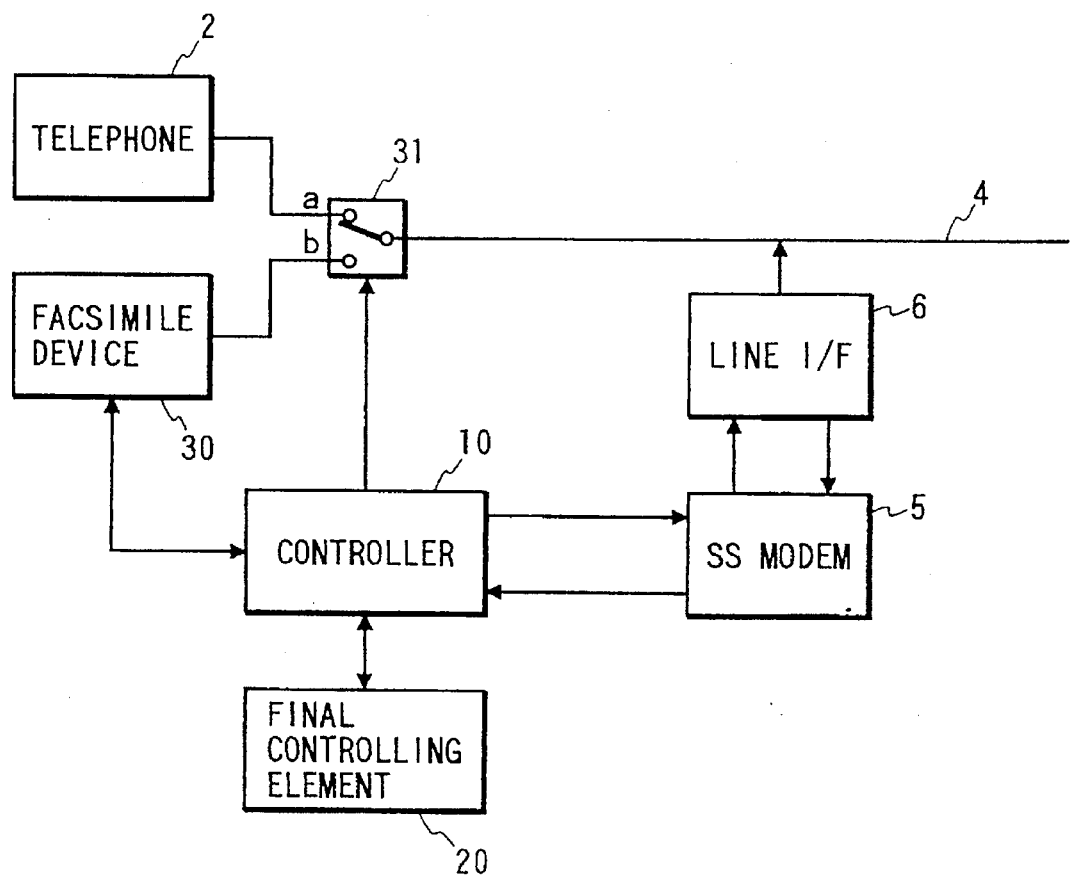
FIG. 6 is a block diagram for illustrating a detailed structure of a case in which the embodiment shown in FIG. 1 is applied to a facsimile system.

FIG. 6 is a block diagram for illustrating an embodiment for the case in which the embodiment shown in FIG. 1 is applied to a facsimile system, and 30 is a facsimile device, 31 is a changeover switch, and the symbols are assigned to the corresponding members in FIG. 2.

The operation of the embodiment is described hereinafter referring to FIG. 7. Herein, two facsimile systems have the structure shown in FIG. 6, and one facsimile system is referred to the facsimile system A and the other facsimile system is referred to the facsimile system B, for the description the facsimile system A is transmitting side and the facsimile system B is receiving side, a manuscript is transmitted from the B facsimile system A to the facsimile system B.

Figure 7:
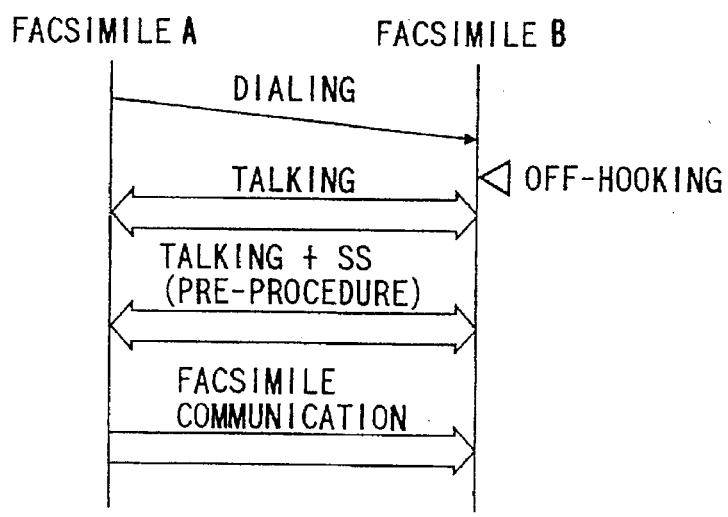
FIG. 7 is a diagram for illustrating a sequence for a case in which data are communicated between two facsimile devices having the structure shown in FIG. 6.

In FIG. 6 and FIG. 7, usually the changeover switch 31 is closed to a-side to allow the system to communicate in telephone mode.

In this situation, the facsimile system A of the transmitter side dials to the facsimile system B of the receiver side, and then the transmitter talks with the receiver using telephones 2. In the case in which the facsimile system 1 transmits a manuscript, the manuscript is set on the facsimile device 30 and starting switch of the final controlling element 20 is operated, then control procedure signal corresponding to digital identification signal and digital command signal of G3 facsimile is output from the controller 10, and the control procedure signal is SS modulated by the SS modem 5 and transmitted through the telephone line 4. After the communication, the controller switches the changeover switch 31 to b-side to communicate in facsimile mode.

During the communication of SS modulated control procedure signal, talking is simultaneously possible as it is possible in the embodiments described hereinbefore, immediately after the switching from the telephone 2 to the facsimile device 30 the transmission and reception of the manuscript start. The conventional facsimile system operates the control procedure after switching to facsimile transmission mode, and it takes approximately 10 seconds for the procedure, after that, the communication of a manuscript starts, therefore the period for procedure is added to the waiting time, but in the case of the embodiment, the procedure is operated during the talking, therefore waiting time is eliminated for easy use.

In the embodiments shown in FIG. 2 and FIG. 6, so called control procedure signal other than image data is modulated by the SS modem 5 and transmitted with voice simultaneously, in another way, image data may be modulated by the SS modem 5 and transmitted with voice simultaneously.

Figure 8:
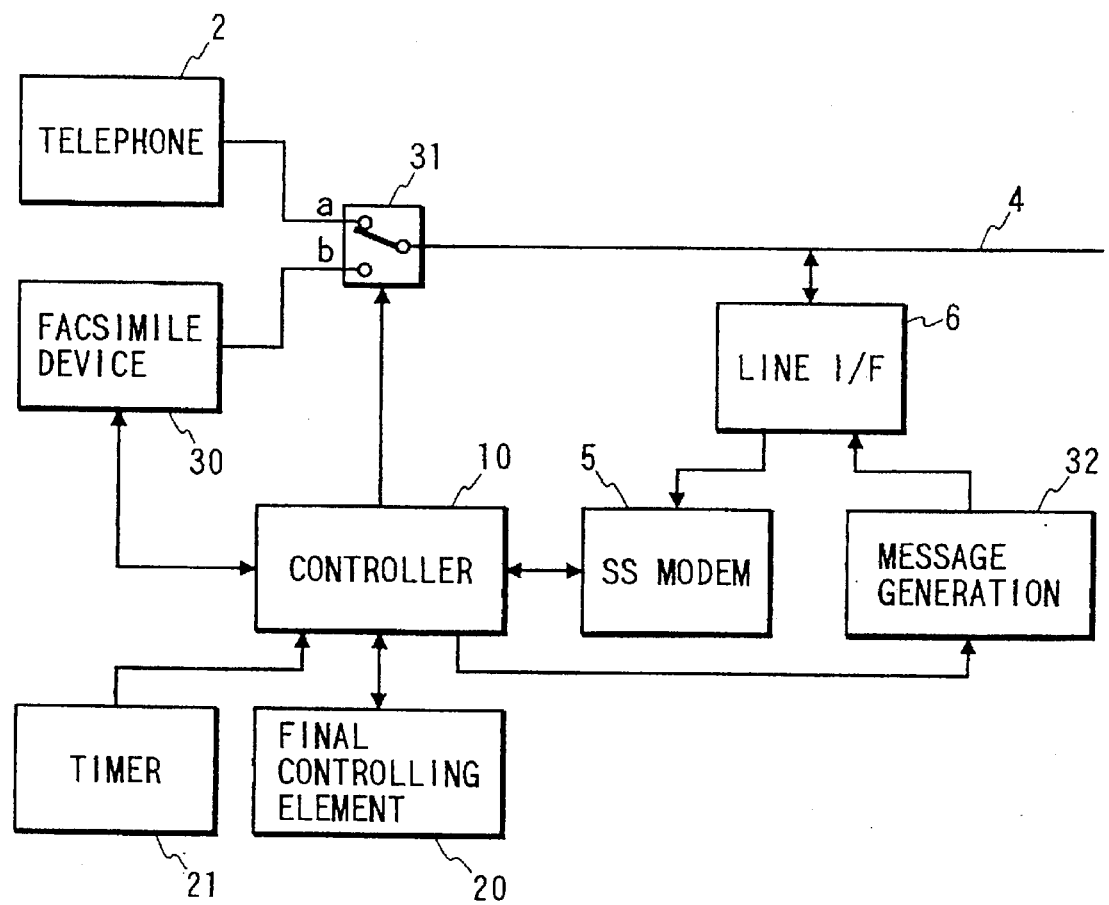
FIG. 8 is a block diagram for illustrating another embodiment in which the embodiment shown in FIG. 1 is applied to a facsimile device.

FIG. 8 is a block diagram for illustrating another detailed structure for the case in which the embodiment shown in FIG. 1 is applied to facsimile system, 32 is a message generating circuit for generating a certain message, and the same symbols are assigned to the corresponding members in previous figures to avoid duplicate description.

The operation of the embodiment is described hereinafter referring to FIG. 9. Herein also, two facsimile systems have the same structure as shown in FIG. 8, and one facsimile system is referred to the facsimile system C and the other facsimile system is referred to the facsimile system D, the facsimile system C is transmitting side and the facsimile system D is receiving side, and a manuscript is transmitted from the facsimile system C to the facsimile system D.

Figure 9:
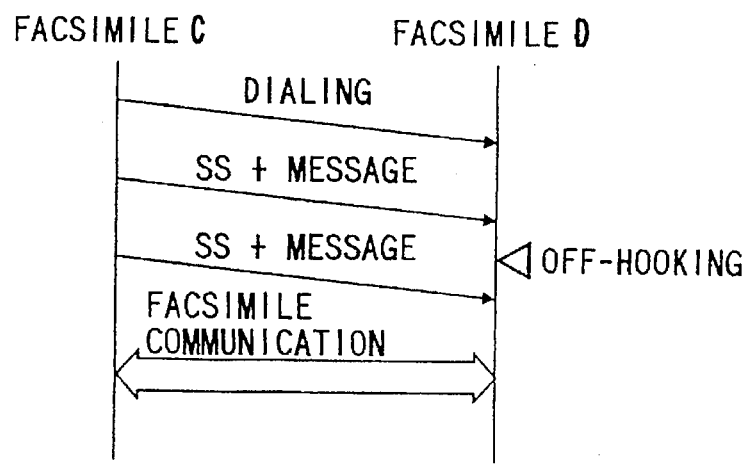
FIG. 9 is a diagram for illustrating a sequence for a case in which data are communicated between two facsimile devices having the structure shown in FIG. 8.

In the embodiment shown in FIG. 6 and FIG. 7, the facsimile system is structured so as that pre-procedure in G3 facsimile device is transmitted using SS modem, but in the embodiment described in FIG. 8 and FIG. 9, the facsimile system is structured so as that signal corresponding to calling tone signal, which is one of control procedure signals in G3 facsimile device, is transmitted using SS modem.

The calling tone signal is a signal for identifying that the calling out station is a non-voice terminal (mostly facsimile system), this signal is essential for the automatic calling out system. Previously, when transmission from an automatic transmission facsimile is received by a telephone, calling tone signal (repeated 0.5 second signal of 1100 Hz and 3 seconds pause) is heard at a telephone receiver, one, who do not know the signal, can not understand the signal and is frustrated, and often hang up the telephone receiver.

Different from such system, in this embodiment the facsimile system C is an automatic transmission system which is structured so as that after dialing the controller 10 transmits signal corresponding to calling tone signal from the SS modem during a certain period counted by the timer circuit 21 or until certain signal is transmitted from the counterpart, simultaneously the controller 10 transmits message for identifying the facsimile transmission, for example, "this is a facsimile message, please push the starting button" from the message generating circuit 32.

The facsimile system D of the calling-in side is also so structured as the facsimile system of the embodiment shown in FIG. 8 as well as the facsimile system C, thereby the facsimile system D receives signal corresponding to calling tone signal by the SS modem 5 and switches to facsimile communication mode. If the facsimile system of the calling-in side is a conventional facsimile system, the counterpart is identified as a conventional facsimile system by hearing message being transmitted from the counterpart facsimile system, and the starting button is pushed without hesitation. If the calling-in side is a conventional telephone, the counterpart is identified as a facsimile system by hearing message being transmitted from the counterpart facsimile system, and the telephone can be hung up without hesitation.

The embodiments which apply the present invention to computer communication, video phone, and facsimile system is described hereinabove, this invention may be applied to non-voice terminals such as telephone answering systems, tele-controlling systems for controlling appliances, and image transmission systems other than equipments described in the embodiments. In the embodiments described hereinbefore, communication through a telephone line is described, but any communication lines are also used.

As described hereinabove, according to the present invention, data signal is modulated and transmitted by spread spectrum system in the same band as voice band, thereby data are transmitted simultaneously with voice without disturbing voice talking, and telephone is communicated without discomfort not only in the case of communication between the same type of systems but also in the case of communication between the different type of systems such as between a conventional telephone and a video phone.

What is claimed is:

1. A data communication apparatus for transmitting data using a communication line intended for voice signal communication, comprising:

a first modulator-demodulator for modulating data by a spread spectrum system;

a second modulator-demodulator for modulating data without said spread spectrum system; and a controller for initially carrying out communication by said first modulator-demodulator, and after a predetermined period or predetermined event carrying out communication by said second modulator-demodulator;

wherein said first modulator-demodulator modulates a control procedure signal of a video phone system, and said second modulator-demodulator modulates video data of said video phone system.

2. A data communication apparatus for transmitting data using a communication line intended for voice signal communication, comprising:

a first modulator-demodulator for modulating data by a spread spectrum system;

a second modulator-demodulator for modulating data without said spread spectrum system; and a controller for initially carrying out communication by said first modulator-demodulator, and after a predetermined period or predetermined event carrying out communication by said second modulator-demodulator;

wherein said first modulator-demodulator modulates a control procedure signal of a facsimile system, and said second modulator-demodulator modulates facsimile data of said facsimile system.

3. A data communication method for transmitting data using a communication line intended for voice signal communication, said data communication method comprising:

- a first modulating step of modulating data by a spread spectrum system;
- a second modulating step of modulating data without said spread spectrum system; and
- a step of carrying out communication by said first modulating step, and after a predetermined period or predetermined event carrying out communication by said second modulating step;
- wherein said first modulating step modulates a control procedure signal of a video phone system, and said second modulating step modulates video data of said video phone system.

4. A data communication method for transmitting data using a communication line intended for voice signal communication, said data communication method comprising:

- a first modulating step of modulating data by a spread spectrum system;
- a second modulating step of modulating data without said spread spectrum system; and
- a step of carrying out communication by said first modulating step, and after a predetermined period or predetermined event carrying out communication by said second modulating step;
- wherein said first modulating step modulates a control procedure signal of a facsimile system, and said second modulating step modulates facsimile data of said facsimile system.

* * * * *